United States Patent
Ogino et al.

(10) Patent No.: US 10,154,221 B2
(45) Date of Patent: Dec. 11, 2018

(54) IMAGING DEVICE, IMAGING SYSTEM, MOBILE APPARATUS, AND DRIVE METHOD OF IMAGING DEVICE

(71) Applicant: CANON KABUSHIKI KAISHA, Tokyo (JP)

(72) Inventors: Masaya Ogino, Kawasaki (JP); Satoshi Koizumi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 15/643,978

(22) Filed: Jul. 7, 2017

(65) Prior Publication Data

US 2018/0063460 A1 Mar. 1, 2018

(30) Foreign Application Priority Data

Aug. 24, 2016 (JP) .................................. 2016-163662

(51) Int. Cl.
| | |
|---|---|
| *G03B 13/00* | (2006.01) |
| *H04N 5/232* | (2006.01) |
| *H04N 5/378* | (2011.01) |
| *H04N 5/369* | (2011.01) |

(52) U.S. Cl.
CPC ........... *H04N 5/378* (2013.01); *H04N 5/3696* (2013.01)

(58) Field of Classification Search
CPC ............. H04N 5/23212; H04N 5/3456; H04N 2209/046; H04N 5/3696; G02B 7/34; G02B 7/28; G02B 7/343; G02B 7/346; G03B 13/36; G01C 3/00
See application file for complete search history.

(56) References Cited

U.S. PATENT DOCUMENTS

| | | | | |
|---|---|---|---|---|
| 6,839,084 B1* | 1/2005 | Hiyama | ............. | H04N 5/23212 348/241 |
| 7,847,362 B2 | 12/2010 | Ogino | | |
| 8,723,095 B2* | 5/2014 | Solhusvik | ......... | H01L 27/14612 250/208.1 |
| 9,197,807 B2* | 11/2015 | Hamada | ............... | H04N 5/3696 |
| 9,380,245 B1* | 6/2016 | Guidash | ............... | H04N 5/3696 |

(Continued)

FOREIGN PATENT DOCUMENTS

| | | |
|---|---|---|
| JP | 2001-249265 | 9/2001 |
| JP | 2001-255455 | 9/2001 |

(Continued)

*Primary Examiner* — Chia Wei A Chen
(74) *Attorney, Agent, or Firm* — Fitzpatrick, Cella, Harper & Scinto

(57) ABSTRACT

An imaging device includes a plurality of pixels each of which outputs at least one of an imaging signal and a ranging signal and performs a first readout operation that reads the imaging signal from a first pixel group of the plurality of pixels, and a second readout operation that, after the first readout operation and before a readout operation for next acquiring the imaging signal, reads the ranging signal from a second pixel group of the plurality of pixels. In the first readout operation, the imaging signal is not read from a third pixel group of the plurality of pixels, in a period from a reset of the first pixel group to a next reset of the first pixel group, the third pixel group is reset, and the second pixel group is selected from the third pixel group based on the imaging signal read by the first readout operation.

17 Claims, 11 Drawing Sheets

(56) References Cited

U.S. PATENT DOCUMENTS

| | | | |
|---|---|---|---|
| 9,621,832 B2 | 4/2017 | Ogino | |
| 2008/0074534 A1* | 3/2008 | Kusaka | H04N 5/23212 348/364 |
| 2008/0231859 A1 | 9/2008 | Ogino | |
| 2011/0273597 A1* | 11/2011 | Ishiwata | H01L 27/14603 348/272 |
| 2011/0273598 A1 | 11/2011 | Ogino | |
| 2012/0097841 A1* | 4/2012 | Noda | H04N 5/3452 250/208.1 |
| 2014/0340555 A1* | 11/2014 | Iwane | H04N 5/343 348/308 |
| 2014/0340565 A1 | 11/2014 | Kitani | |
| 2014/0375852 A1 | 12/2014 | Ogino | |
| 2015/0156428 A1* | 6/2015 | Uchida | H04N 5/3696 348/294 |
| 2015/0319388 A1* | 11/2015 | Ohshitanai | H04N 5/378 348/301 |
| 2016/0309102 A1 | 10/2016 | Koizumi | |
| 2017/0094153 A1* | 3/2017 | Wang | H04N 5/23212 |
| 2017/0195606 A1* | 7/2017 | Bahar | H04N 5/3765 |
| 2017/0214871 A1* | 7/2017 | Kanehara | H04N 5/35563 |
| 2017/0257554 A1* | 9/2017 | Huang | H01L 27/14621 |
| 2018/0003923 A1* | 1/2018 | Fukuda | G02B 7/34 |
| 2018/0131862 A1* | 5/2018 | Galor Gluskin | G06T 7/11 |
| 2018/0167575 A1* | 6/2018 | Watanabe | H04N 5/378 |
| 2018/0196221 A1* | 7/2018 | Sun | G02B 7/28 |
| 2018/0205895 A1* | 7/2018 | Mitsunaga | H04N 5/225 |

FOREIGN PATENT DOCUMENTS

| | | |
|---|---|---|
| JP | 2014-241577 | 12/2014 |
| JP | 2016-123012 | 7/2016 |

\* cited by examiner

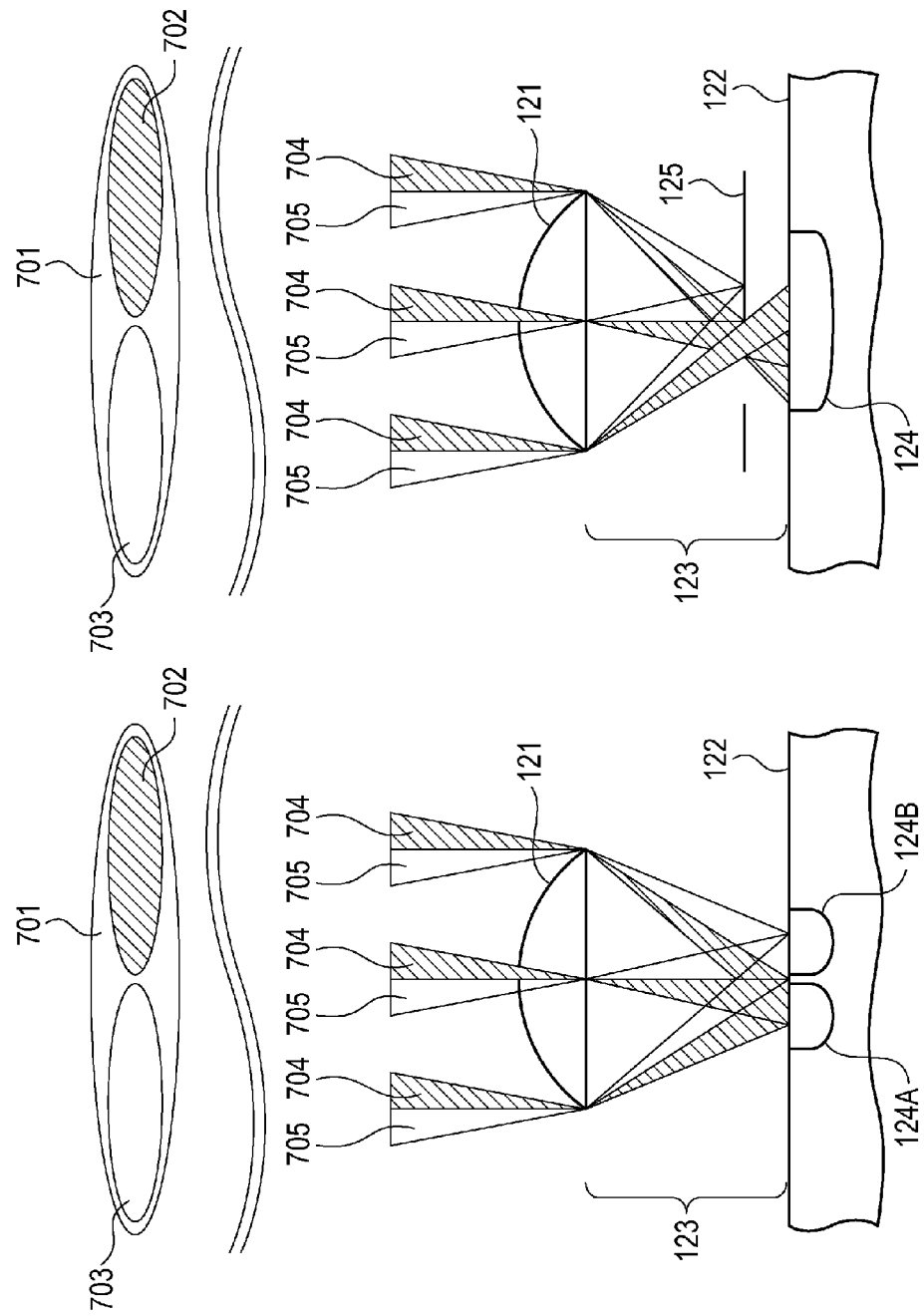

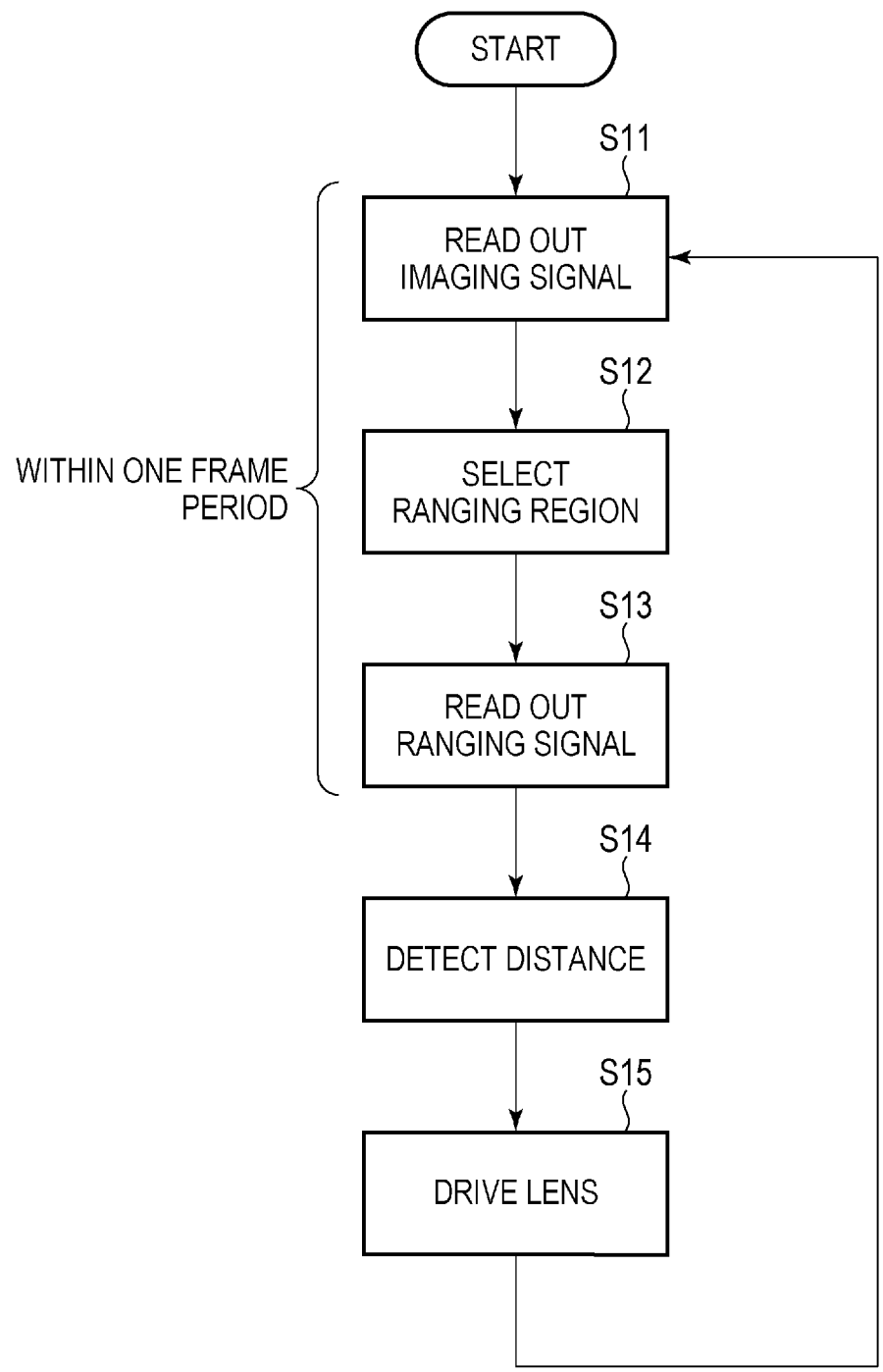

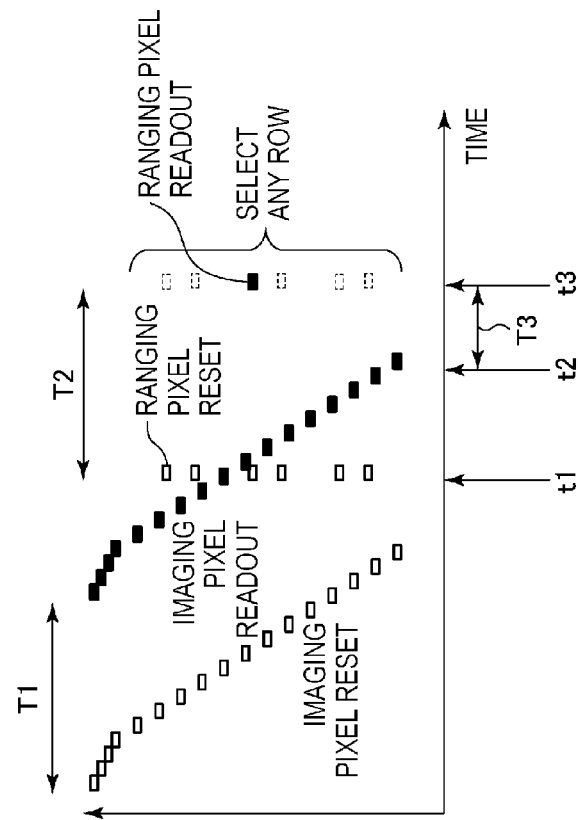
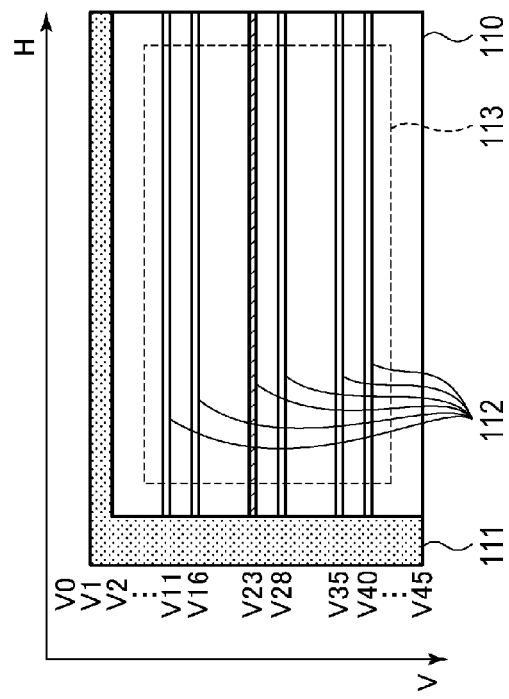

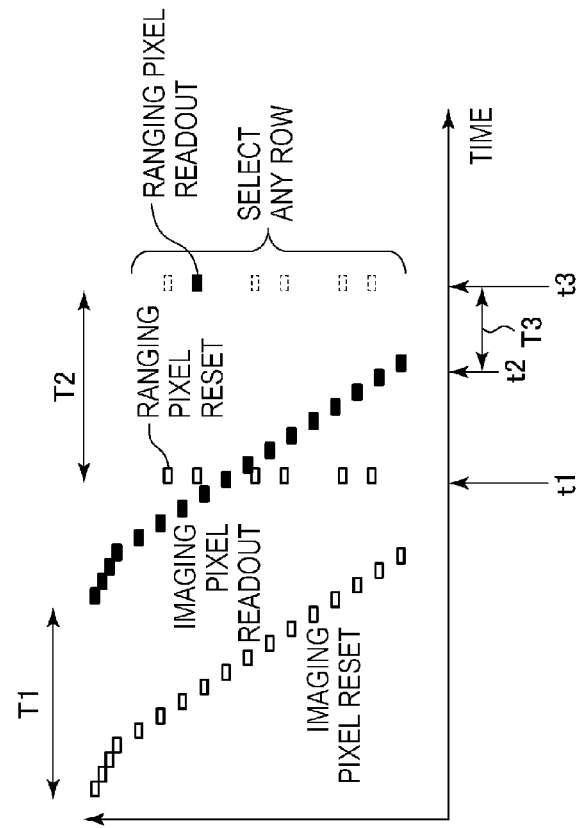
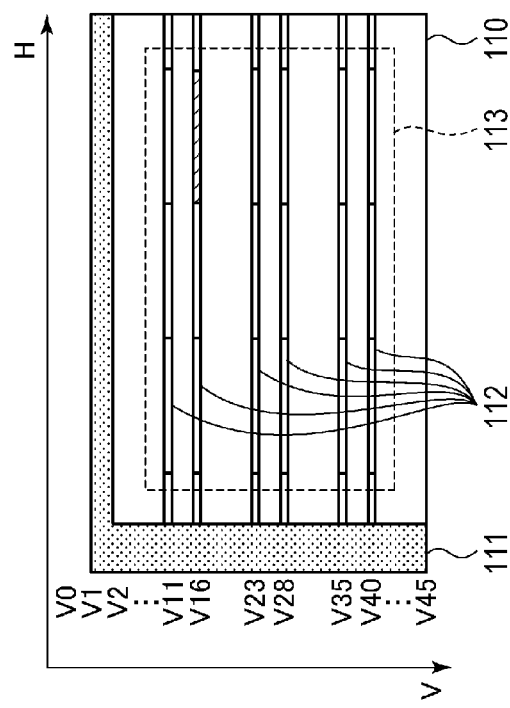

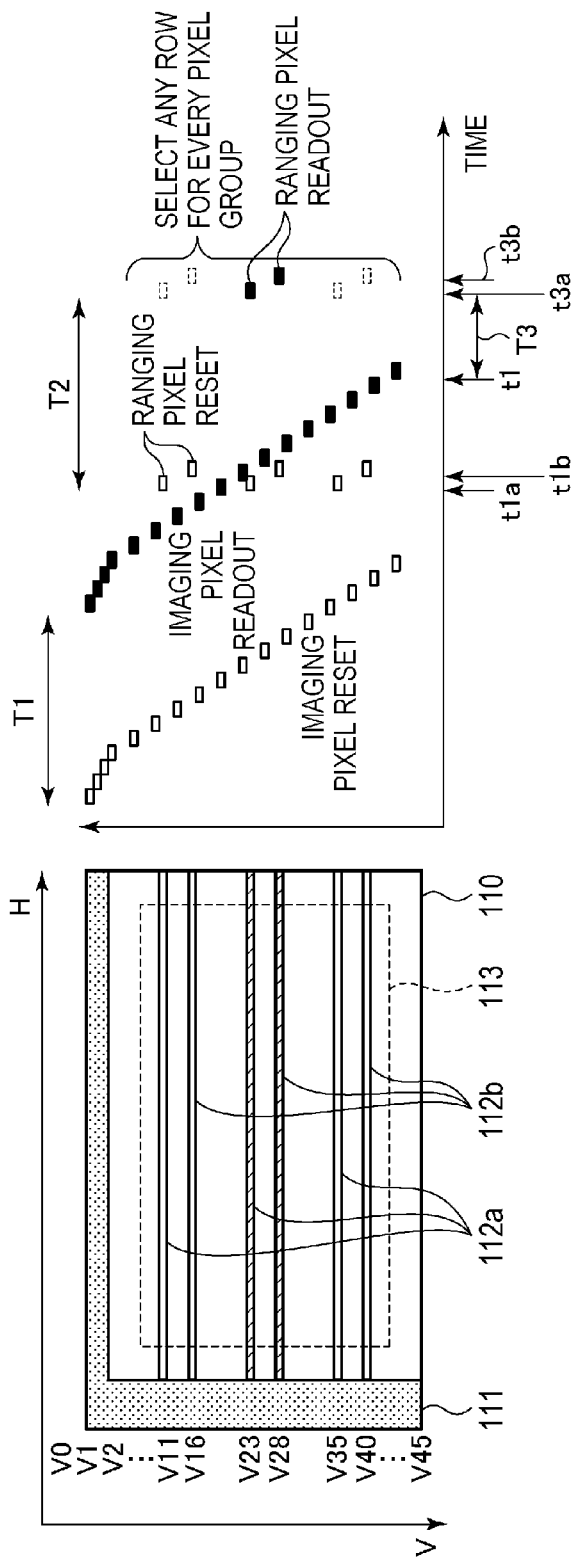

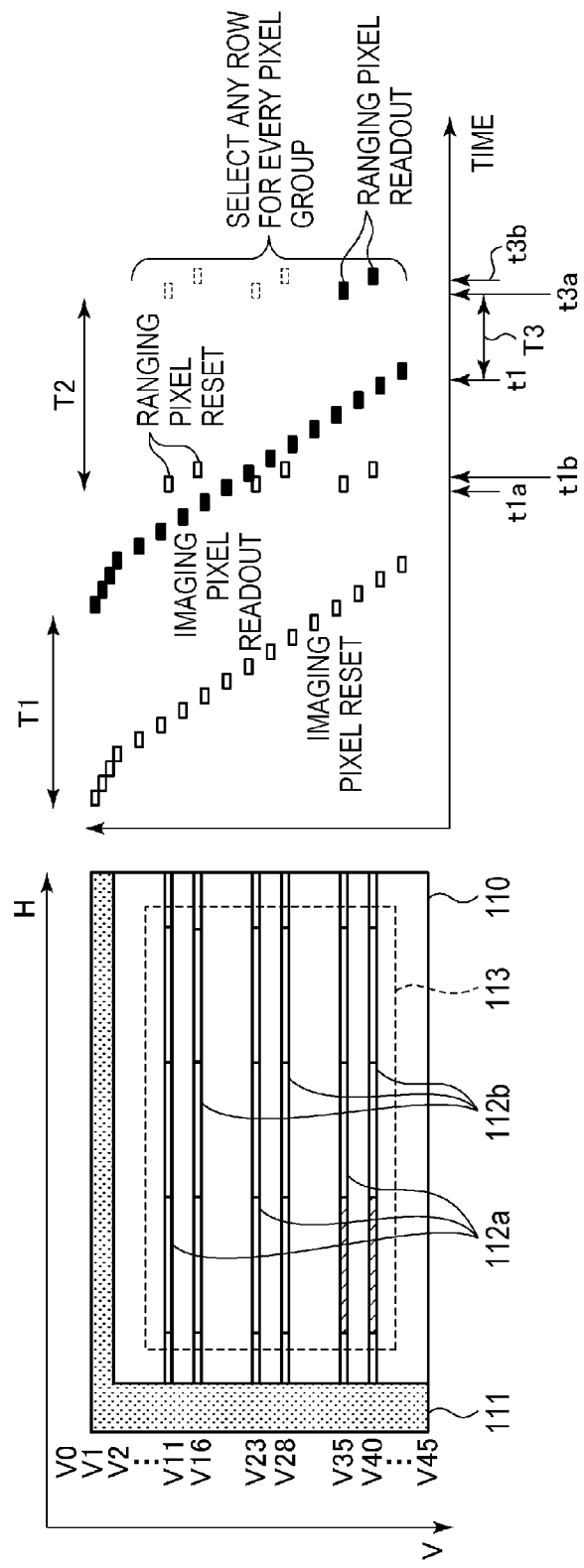

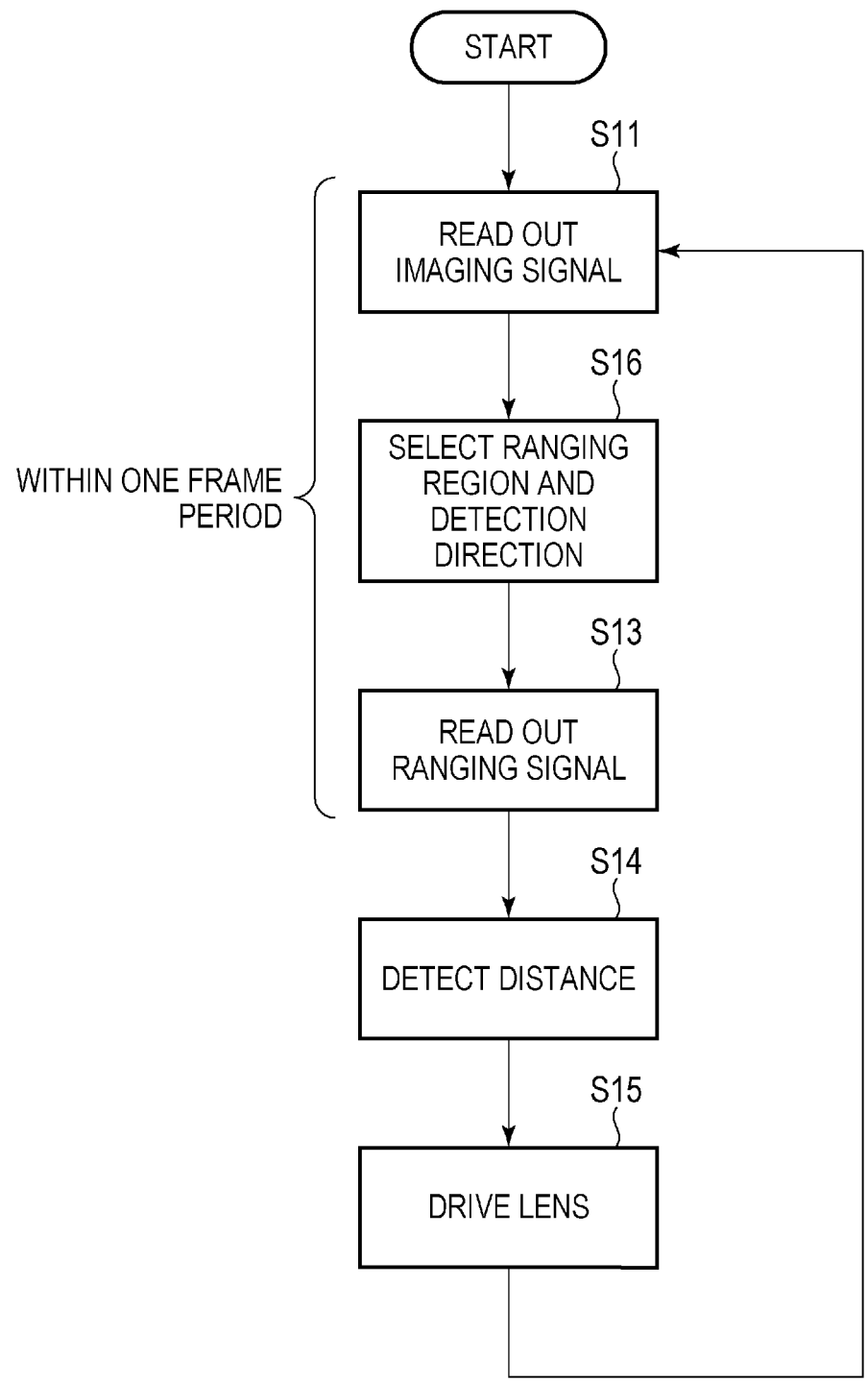

IMAGING DEVICE, IMAGING SYSTEM, MOBILE APPARATUS, AND DRIVE METHOD OF IMAGING DEVICE

BACKGROUND OF THE INVENTION

Field of the Invention

The present invention relates to an imaging device, an imaging system, a mobile apparatus, and a drive method of the imaging device.

Description of the Related Art

Japanese Patent Application Laid-Open No. 2014-241577 discloses an imaging device that performs readout for image production by reducing rows to be read out on which pixels used for focus detection are arranged. The imaging device performs readout of rows on which pixels used for focus detection are arranged before or after the readout for image production.

Japanese Patent Application Laid-Open No. 2001-255455 discloses a ranging device that detects a head of a person from an image in order to determine an object to be ranged.

In the imaging device of Japanese Patent Application Laid-Open No. 2014-241577, pixels to be reduced are fixed. Thus, ranging information may not be obtained on a desired region. This may result in an insufficient accuracy of ranging.

In the ranging device of Japanese Patent Application Laid-Open No. 2001-255455, ranging can be performed in a region where an object is detected. When ranging of a dynamically moving object is performed or when an imaging area changes due to motion of the imaging device, however, this may cause a large difference between an object image in an image used for detecting a ranging region and an object image in performing an actual ranging. This difference is likely to cause an insufficient accuracy of ranging.

SUMMARY OF THE INVENTION

An imaging device according to one embodiment of the present invention is an imaging device having a plurality of pixels each of which outputs at least one of an imaging signal and a ranging signal, wherein the imaging device performs a first readout operation that reads out the imaging signal from a first pixel group of the plurality of pixels, and a second readout operation that, after the first readout operation and before a readout operation for next acquiring the imaging signal is performed, reads out the ranging signal from a second pixel group of the plurality of pixels, wherein, in the first readout operation, the imaging signal is not read out from a third pixel group of the plurality of pixels, in a period from a reset of the first pixel group to a next reset of the first pixel group, the third pixel group is reset, and the second pixel group is selected from the third pixel group based on the imaging signal read out by the first readout operation.

A drive method of an imaging device according to one embodiment of the present invention is a drive method of an imaging device including a plurality of pixels each of which outputs at least one of an imaging signal and a ranging signal, the drive method including: a first readout step of reading out the imaging signal from a first pixel group of the plurality of pixels, wherein the imaging signal is not read out from a third pixel group of the plurality of pixels; a reset step of resetting the third pixel group in a period from a reset of the first pixel group to a next reset of the first pixel group; a selection step of selecting the second pixel group from the third pixel group based on the imaging signal read out by the first readout step; and a second readout step of reading out the ranging signal from the second pixel group after the first readout step and before a readout step for next acquiring the imaging signal is performed.

Further features of the present invention will become apparent from the following description of exemplary embodiments with reference to the attached drawings.

BRIEF DESCRIPTION OF THE DRAWINGS

FIG. 4A and FIG. 4B are sectional views of pixels according to the first embodiment of the present invention.

FIG. 5 is an operation flowchart of an imaging system according to the first embodiment of the present invention.

FIG. 6A is an arrangement diagram of a pixel array according to the first embodiment of the present invention.

FIG. 6B is a schematic diagram of drive timings according to the first embodiment of the present invention.

FIG. 7A is an arrangement diagram of a pixel array according to a modified example of the first embodiment of the present invention.

FIG. 7B is a schematic diagram of drive timings according to the modified example of the first embodiment of the present invention.

FIG. 8A is an arrangement diagram of a pixel array according to a second embodiment of the present invention.

FIG. 8B is a schematic diagram of drive timings according to the second embodiment of the present invention.

FIG. 9A is an arrangement diagram of a pixel array according to a modified example of the second embodiment of the present invention.

FIG. 9B is a schematic diagram of drive timings according to the modified example of the second embodiment of the present invention.

FIG. 10 is an operation flowchart of an imaging system according to a third embodiment of the present invention.

DESCRIPTION OF THE EMBODIMENTS

Preferred embodiments of the present invention will now be described in detail in accordance with the accompanying drawings.

First Embodiment

The first embodiment of the present invention will be described below in detail with reference to the drawings.

Figure 1:
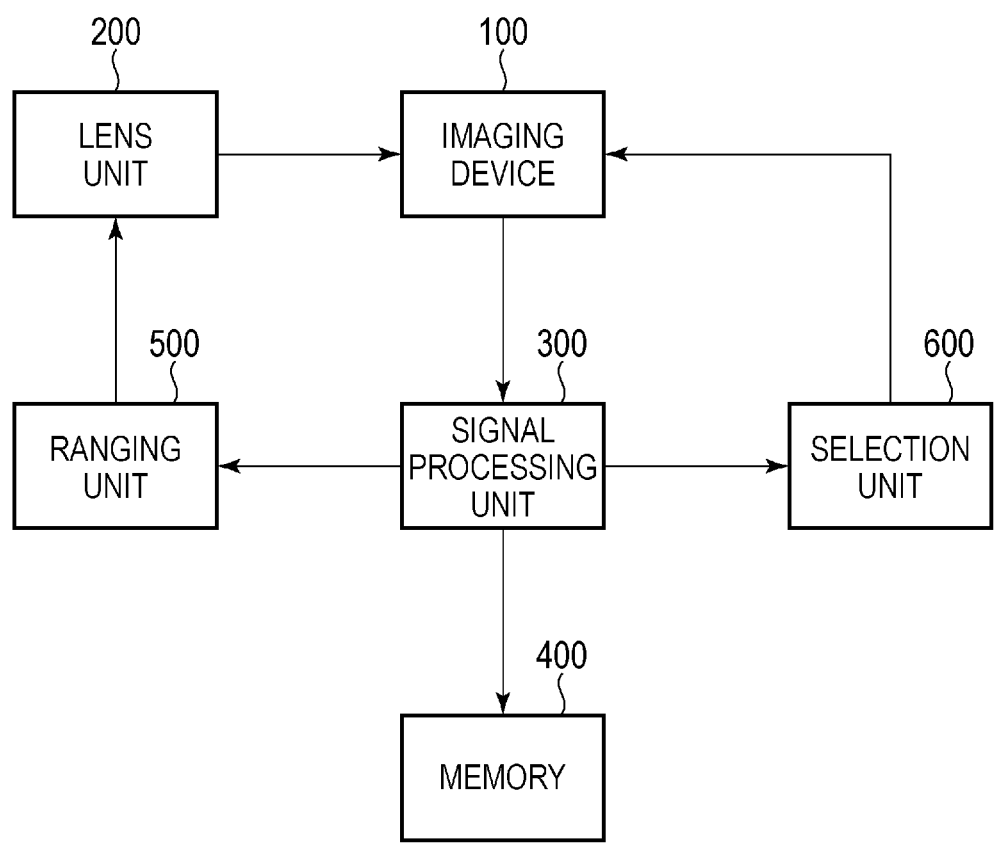
FIG. 1 is a block diagram of an imaging system according to a first embodiment of the present invention.

FIG. 1 is a block diagram illustrating a configuration of an imaging system of the present embodiment. While not limited in particular, the imaging system according to the present embodiment is applicable to a digital still camera, a digital camcorder, a camera head, a copier machine, a fax machine, a cellular phone, a vehicle-mounted camera, an observation satellite, or the like, for example.

The imaging system has an imaging device 100, a lens unit 200, a signal processing unit 300, a memory 400, a ranging unit 500, and a selection unit 600. The imaging device 100 is a solid state imaging device such as a Complementary Metal Oxide Semiconductor (CMOS) image sensor. The lens unit 200 is an optical system for capturing an optical image of an object on a pixel array of the imaging device 100. The lens unit 200 includes optical components such as a lens, a diaphragm, and the like. Further, the lens unit 200 has a mechanism that changes a focus position by changing the position of the lens.

The imaging device 100 outputs a signal based on an incident light captured on the pixel array to the signal processing unit 300. The signal processing unit 300 performs signal processing such as correction, data compression, or the like on a signal output from the imaging device 100. For example, the signal processing unit 300 is formed of a digital signal processor that performs the above processing. The signal processed by the signal processing unit 300 is recorded as image data in the memory 400. Further, a signal processed by the signal processing unit 300 is supplied to the ranging unit 500. The ranging unit 500 performs ranging between the imaging system and the object by using the above signal. Based on a ranging result obtained by the ranging unit 500, the lens of the lens unit 200 is driven, and adjustment of the focus position is performed.

Furthermore, the signal processed by the signal processing unit 300 is supplied also to the selection unit 600. The selection unit 600 uses a signal processed by the signal processing unit 300 to perform selection of a ranging area, selection of a ranging direction, or the like and reflects the result thereof to the drive of the imaging device 100.

Note that the imaging system further includes an entire control unit (not depicted) that controls the entire drive or the like of the imaging system and a timing generating unit (not depicted) that outputs various timing signals to the imaging device 100 and the signal processing unit 300. Further, the functions of the ranging unit 500 and the selection unit 600 may be encompassed in any of the signal processing unit 300, the imaging device 100, or the entire control unit as a function thereof.

Figure 2:
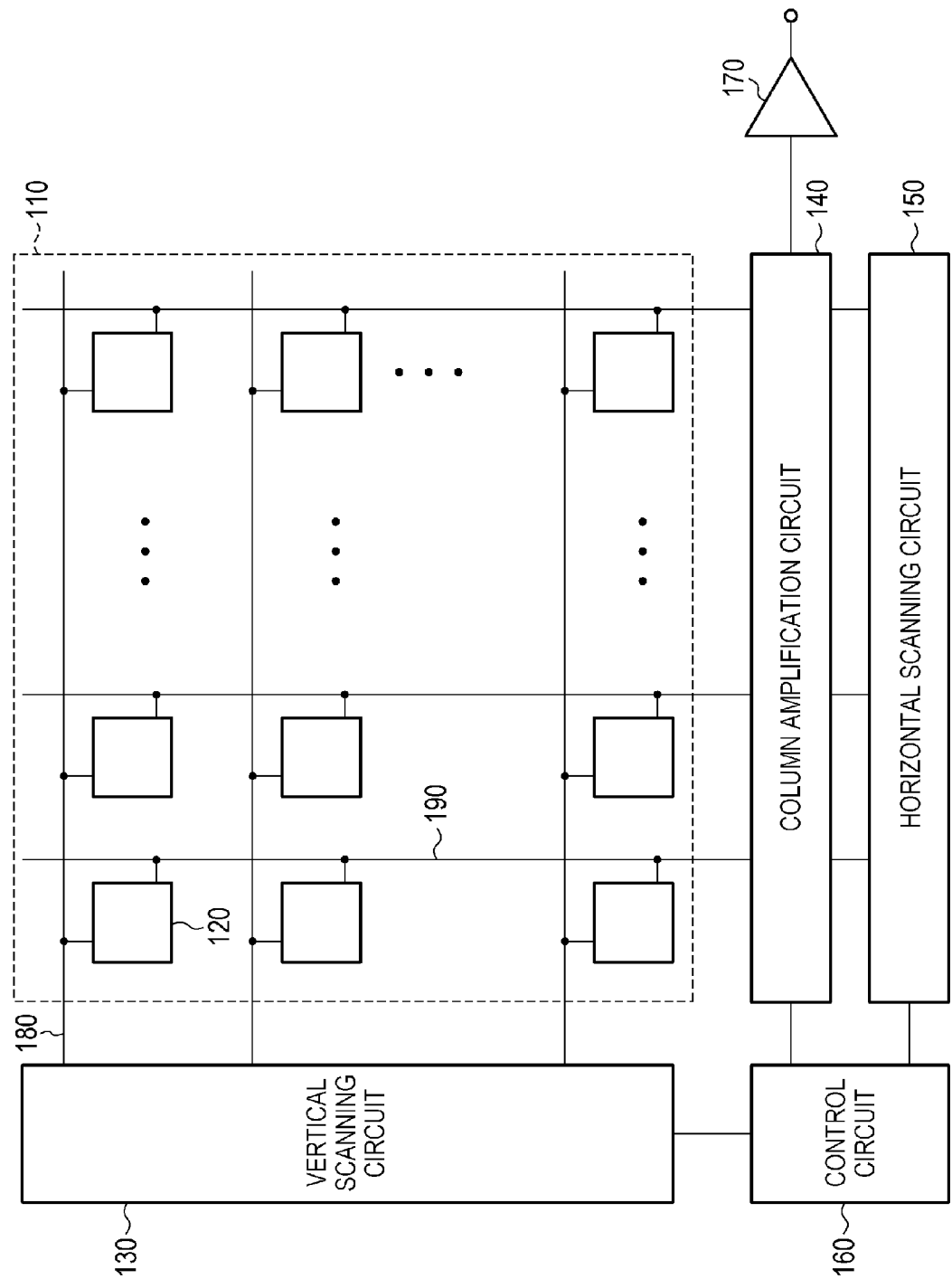
FIG. 2 is a block diagram of an imaging device according to the first embodiment of the present invention.

FIG. 2 is a block diagram illustrating a configuration of the imaging device 100 according to the first embodiment of the present invention. The imaging device 100 has a pixel array 110, a vertical scanning circuit 130, a column amplification circuit 140, a horizontal scanning circuit 150, a control circuit 160, and an output circuit 170. These circuits are formed on one or more semiconductor substrates. The pixel array 110 has a plurality of pixels 120 arranged to form a plurality of rows and a plurality of columns. The vertical scanning circuit 130 is a scanning circuit that supplies control signals for controlling transistors included in the pixels 120 to be turned on (conductive state) or turned off (non-conductive state) via control signal lines 180 provided associated with respective rows of the pixels 120. Here, since the control signal supplied to each pixel 120 includes multiple sorts of control signals, the control signal line 180 on each row is formed as a set of a plurality of drive wirings. Furthermore, the column signal lines 190 are provided associated with respective columns of the pixels 120 in the imaging device 100, and signals from the pixels 120 are read out to the column signal lines 190 on a column basis.

The column amplification circuit 140 performs a process such as amplification, correlated double sampling process, or the like on the signal output to the column signal lines 190. The horizontal scanning circuit 150 supplies control signals for sequentially outputting signals associated with respective columns from the column amplification circuit 140 to the output circuit 170 by controlling switches connected to amplifiers of the column amplification circuit 140 to be turned on or off. The output circuit 170 is formed of a buffer amplifier, a differential amplifier, or the like and outputs a signal from the column amplification circuit 140 to the signal processing unit 300 outside the imaging device 100. Note that the imaging device may further have an analog-to-digital (A/D) conversion unit, and in this case, the imaging device outputs a digital signal. For example, the column amplification circuit 140 includes the AD conversion unit. Further, the output circuit 170 may be configured to include an AD conversion unit. The control circuit 160 controls operation timings or the like of the vertical scanning circuit 130, the column amplification circuit 140, and the horizontal scanning circuit 150.

Figure 3A:
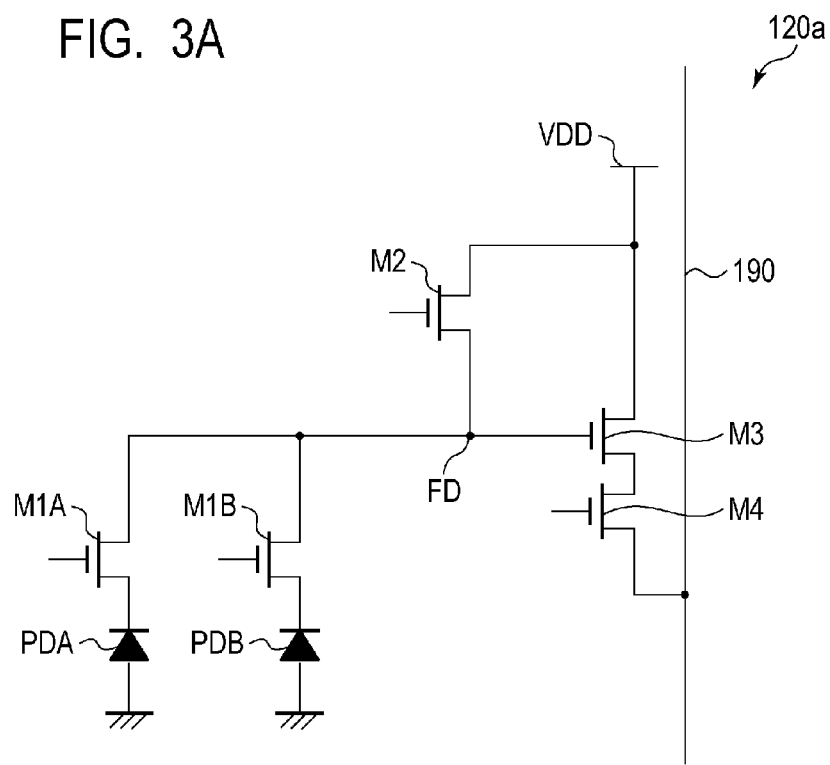
FIG. 3A and FIG. 3B are circuit diagrams of pixels according to the first embodiment of the present invention.

Next, a specific example of the circuit configuration of the pixel 120 will be described with reference to FIG. 3A and FIG. 3B. A pixel 120a of FIG. 3A and a pixel 120b of FIG. 3B correspond to the pixel 120 of FIG. 2. FIG. 3A is a circuit diagram of the pixel 120a in the imaging device according to the present embodiment. The pixel 120a has photodiodes PDA and PDB, a floating diffusion FD, transfer transistors M1A and M1B, a reset transistor M2, an amplification transistor M3, and a selection transistor M4. Each of these transistors is formed of a MOS transistor having a gate electrode as a control electrode. Each gate of the transfer transistors M1A and M1B, the reset transistor M2, and the selection transistor M4 is input with control signals for controlling these transistors via the control signal lines 180 from the vertical scanning circuit 130.

Each of the photodiodes PDA and PDB is a photoelectric conversion element that generates charges in accordance with an incident light by photoelectric conversion and accumulates these charges. Each of the photodiodes PDA and PDB is formed of a PN junction formed inside a semiconductor substrate. Once turned on, the transfer transistor M1A transfers charges of the photodiode PDA to the floating diffusion FD. Once turned on, the transfer transistor M1B transfers charges of the photodiode PDB to the floating diffusion FD. That is, two photodiodes PDA and PDB and two transfer transistors M1A and M1B share one floating diffusion FD.

The floating diffusion FD is a diffusion region connected to the gate electrode of the amplification transistor M3. In accordance with a capacitance occurring in the floating diffusion FD, the potential of the floating diffusion FD changes in response to charges transferred from the photodiodes PDA and PDB. The drain of the amplification transistor M3 is connected to the power source voltage line having a power source voltage VDD. The source of the amplification transistor M3 is connected to the column signal line 190 via the selection transistor M4. The amplification transistor M3 forms a source follower circuit together with a constant current source (not depicted) connected to the column signal line 190. This source follower circuit outputs a signal based on the voltage of the floating diffusion FD to the column signal line 190 via the selection transistor M4. Once turned on, the reset transistor M2 resets the potential of the floating diffusion FD.

According to this circuit configuration, the pixel 120a has the two photodiodes PDA and PDB and thereby can read out an imaging signal and a ranging signal from one pixel 120a. Specifically, readout is performed with either one of the transfer transistor M1A and the transfer transistor M1B being turned on, and thereby a ranging signal can be acquired. Further, readout is performed with both of the transfer transistor M1A and the transfer transistor M1B being turned on, signals light-received by the photodiodes PDA and PDB can be added to acquire an imaging signal.

Figure 3B:
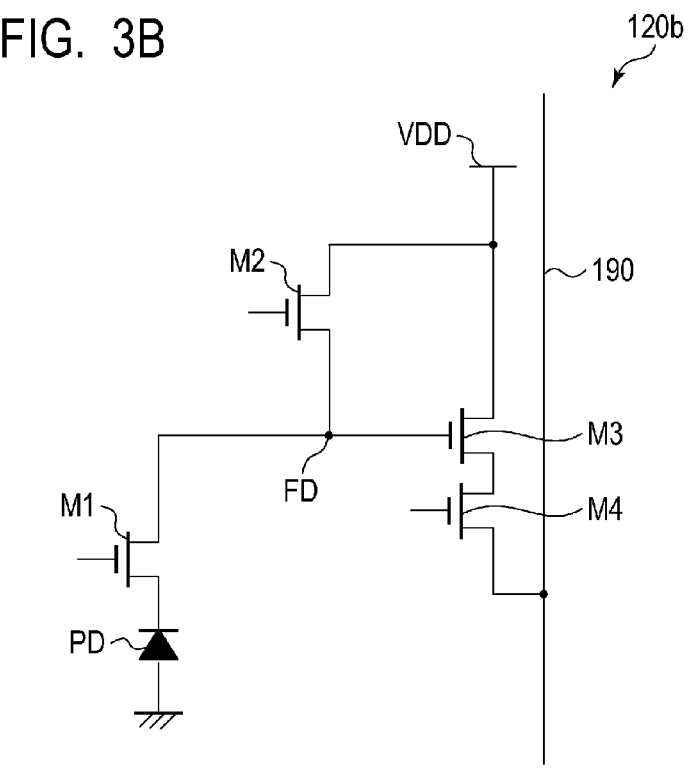

FIG. 3B is a circuit diagram of the pixel 120b in the imaging device according to the present embodiment. The pixel 120b illustrated in FIG. 3B has only one photodiode PD and one transfer transistor M1, which makes a difference from the pixel 120a illustrated in FIG. 3A. Since other circuit configurations are the same as those in FIG. 3A, the description thereof will be omitted. The pixel 120b can output either one of an imaging signal and a ranging signal.

FIG. 4A is a sectional view of the pixel 120a, and FIG. 4B is a sectional view of the pixel 120b. Further, each of FIG. 4A and FIG. 4B illustrates a pupil 701, a pupil 702 and a pupil 703 that are parts of the pupil 701, and light fluxes 704 and 705 that have passed through the pupils 702 and 703, respectively.

An example of the configuration of the pixel 120a will be described with reference to FIG. 4A. The pixel 120a has a substrate 122, an interlayer film 123 formed on the substrate 122, and a micro lens 121 formed on the interlayer film 123. Semiconductor regions 124A and 124B are formed inside the substrate 122. The substrate 122 is formed of a semiconductor material such as a silicon. Note that any substrate 122 may be employed as long as it can form a photoelectric conversion unit and, for example, may be a photoelectric conversion film or the like. The semiconductor regions 124A and 124B are impurity diffusion regions forming the photodiodes PDA and PDB. The interlayer film 123 is an interlayer insulating film formed between layers of wiring layers (not depicted). The interlayer film 123 is formed of a material that transmits an incident light. The micro lens 121 converges an incident light onto the semiconductor regions 124A and 124B.

The light flux 704 that has passed through one pupil region 702 enters the semiconductor region 124A via the micro lens 121. The light flux 705 that has passed through another pupil region 703 enters the semiconductor region 124B via the micro lens 121. Thereby, signals obtained by photoelectrically converting the light fluxes 704 and 705 can be individually acquired, respectively. A plurality of signals obtained in such a way are used as ranging signals by using a phase difference detection scheme. Further, with addition or averaging of signals obtained by photoelectrically converting the light fluxes 704 and 705, an imaging signal can be acquired.

An example of the configuration of the pixels 120b will be described with reference to FIG. 4B. This configuration example is an example of the pixel 120b that can acquire a ranging signal. The pixel 120b has the substrate 122, the interlayer film 123 formed on the substrate 122, and the micro lens 121 formed on the interlayer film 123. A semiconductor region 124 is formed inside the substrate 122. Furthermore, the pixel 120b has a light shield portion 125 between the substrate 122 and the micro lens 121 so as to shield a part of the semiconductor region 124.

When the right side of the semiconductor region 124 is shielded as illustrated in FIG. 4B, the light flux 704 that has passed through one pupil region 702 enters the semiconductor region 124 via the micro lens 121. However, the light flux 705 that has passed through the other pupil region 703 is shielded by the light shield portion 125 and thus does not enter the semiconductor region 124. Therefore, the pixel 120b illustrated in FIG. 4B can acquire a signal obtained by photoelectrically converting the light flux 704. Further, with the left side of the semiconductor region 124 being shielded as modified structure of FIG. 4B, a pixel may be configured to be able to acquire a signal obtained by photoelectrically converting the light flux 705. Pixels having different shielded positions are arranged within a pixel array 110 in such a way, and thereby a signal based on light fluxes passing through different regions of a pupil can be individually acquired as a ranging signal. The signal obtained in such a way can be used as a ranging signal with a phase difference detection scheme.

Further, the pixel 120b may be configured to have no light shield portion 125. A signal acquired from the pixel 120b without the light shield portion 125 can be used as an imaging signal.

The orientation in which one pupil region 702 and another pupil region 703 are aligned may be the vertical direction (perpendicular direction) or may be lateral direction (horizontal direction) of the pixel array 110 illustrated in FIG. 2. It is possible to perform ranging by using a phase difference detection scheme in a detection direction in accordance with the orientation in which one pupil region 702 and another pupil region 703 are aligned. Further, while divided into two, namely, one pupil region 702 and another pupil region 703 in the present embodiment, the pupil 701 may be divided into three or more regions.

In the present embodiment, pixels which can acquire a ranging signal are aligned in a part of or a whole of the pixel array 110. For example, the pixel 120a illustrated in FIG. 3A and FIG. 4A can output an imaging signal or a ranging signal in accordance with a drive method of readout. Thus, when the pixel 120a is used in the pixel array 110, the pixel 120a functions as an imaging pixel or a ranging pixel in accordance with the drive method. Therefore, the imaging device 100 that enables imaging and ranging is provided.

When the pixel 120b illustrated in FIG. 3B and FIG. 4B is used for the pixel array 110, a pixel in which a part of the semiconductor region 124 is shielded by the light shield portion 125 is provided on a portion of the pixel array 110 as a ranging pixel, for example. A pixel in which the semiconductor region 124 is not shielded is provided as an imaging pixel on a part of the other portion of the pixel array 110. Thereby, the imaging device 100 that enables imaging and ranging is provided.

FIG. 5 is a flowchart of the operation of an imaging system according to the present embodiment. The flowchart illustrates a process in an operation mode that repeats ranging and imaging such as a moving image capturing mode, a live view operation mode, or the like. After the start of this process, at step S11, an imaging signal is read out from imaging pixels (first pixel group) of the imaging device 100 to the signal processing unit 300 (first readout operation). At step S12, the selection unit 600 uses an image generated from an imaging signal in the signal processing unit 300 to select a ranging region for reading out a ranging signal and supplies the information to the imaging device 100 (selection operation). At step S13, a ranging signal is read out from ranging pixels (second pixel group) corresponding to the ranging region defined at step S12 to the signal processing unit 300 (second readout operation). At step S14, the ranging unit 500 detects a distance between an object in the ranging region and the imaging system based on a ranging signal. At step S15, a lens within the lens unit 200 is driven so as to be focused at the distance detected at step S14. The operation from step S11 to step S15 is then repeated.

Here, the operation from step S11 to step S13 is performed within one frame period. A frame period is defined as a period from the time when a particular pixel (for example, the pixel 120 in the left-upper of the pixel array 110) in the imaging device 100 is reset to the next time when the particular pixel is reset again.

FIG. 6A is an arrangement diagram of the pixel array 110 according to the first embodiment, and FIG. 6B is a schematic diagram of drive timings of the imaging device 100 according to the first embodiment.

In the drive method of the imaging device 100, a scheme called rolling shutter that sequentially performs readout on a row basis is used. While readout by rolling shutter is sequentially performed from an upper row of the pixel array 110 in the following description, the readout scheme is not limited thereto. For example, a drive method of sequentially performing readout from a lower row of the screen may be employed.

First, the configuration of the pixel array 110 will be described with reference to FIG. 6A. While the pixel array 110 may include several thousand or more rows of pixels 120 in practice, a case where the pixel array 110 includes 46 rows from row V0 to row V45 is exemplified in FIG. 6A for simplified illustration. Further, a readout method of the present embodiment employs a scheme of reading out one row out of every three rows of the pixel array 110 and not reading the remaining two rows (reduced readout) except a part of a region. However, the readout method of the imaging device 100 may employ other types of reduced readout or may employ a scheme of reading out all the rows without reduction.

An optical black (OB) pixel region 111 in which OB pixels are aligned is provided in the upper end and the left end of the pixel array 110. Each OB pixel is a pixel for acquiring a signal corresponding to a noise due to a dark current or the like and has the structure in which the upper part of the photodiode is completely shielded. In the present embodiment, all the pixels on the rows V0, V1, and V2 included in the OB pixel region 111 are read out without reduction.

Six rows, namely, the rows V11, V16, V23, V28, V35, and V40 are ranging pixel arrangement rows 112 including ranging pixels. Imaging pixels are provided to a region except the OB pixel region 111 and the ranging pixel arrangement rows 112. Further, in FIG. 6A, the whole area where ranging in the pixel array 110 can be performed is illustrated as a ranging region 113.

When the pixel 120a illustrated in FIG. 3A and FIG. 4A is used for the pixel array 110, the same type of pixels 120a are provided to both the ranging pixel arrangement rows 112 and other rows. Due to the difference in the readout method, ranging signals are read out from the pixels 120a on the ranging pixel arrangement rows 112, and imaging signals are read out from the pixels 120a on other rows. In other words, the pixels 120a of the ranging pixel arrangement rows 112 are used as ranging pixels, and the pixels 120a of other rows are used as imaging pixels.

When the pixel 120b illustrated in FIG. 3B and FIG. 4B is used for the pixel array 110, ranging pixels each having the light shield portion 125 are provided on the ranging pixel arrangement rows 112. Imaging pixels without the light shield portion 125 are provided on other rows.

Note that, while there is a case where no imaging signal is obtained from the ranging pixel arrangement rows 112 on which ranging pixels are provided, image data corresponding to the position of a ranging pixel can be obtained by using signals of surrounding imaging pixels for interpolation.

FIG. 6B is a schematic diagram illustrating drive timings in one frame period of the imaging device 100 and illustrates reset and readout periods of the pixels 120 on respective rows. The horizontal axis of FIG. 6B represents elapsed time. The vertical axis of FIG. 6B corresponds to row numbers of FIG. 6A. Each white rectangle illustrates reset of an imaging pixel or reset of a ranging pixel, the left side of each rectangle represents the reset time of a pixel on the left end of the pixel array 110, and the right side represents the reset time of a pixel of the right end of the pixel array 110. Further, each black rectangle represents readout of an imaging pixel or readout of a ranging pixel, and the left side and the right side represent the readout time of pixels on the left end and the right end of the array in a similar manner to the case of reset.

First, reset of each imaging pixel is sequentially performed. Then, at a timing when an accumulation time period T1 (first accumulation time period) has elapsed for every imaging pixel, readout from the imaging pixels (first pixel group) is performed (first readout operation). At the time t2, readout of the last row of the imaging pixels is performed, and readout of imaging pixels then ends. This operation corresponds to step S11 of FIG. 5. In this readout operation, no imaging signal is read out from pixels provided on the rows V11, V16, V23, V28, V35, and V40 including a plurality of ranging pixels (third pixel group).

In parallel to readout of imaging pixels, reset of a plurality of ranging pixels is performed at the time t1. That is, the time t1 is the time before the completion of readout of imaging pixels. At this time, reset is simultaneously performed on a plurality of ranging pixels. Then, at the time t3 when an accumulation time period T2 (second accumulation time period) has elapsed, readout from selected ranging pixels (second pixel group) out of a plurality of ranging pixels is performed (second readout operation). This operation corresponds to step S13 of FIG. 5. Note that it is not essential that readout of imaging pixels and reset of ranging pixels be performed in parallel, and it is preferable that reset of ranging pixels be performed during a period after imaging pixels are reset and before the imaging pixels are next reset again. For example, reset of ranging pixels may be performed after the completion of readout of imaging pixels.

In a region selection time period T3 from the time t2 to the time t3, the selection unit 600 selects, from the ranging region 113, a region on which readout of ranging pixels is performed based on the imaging signal read out by the time t2. This operation corresponds to step S12 of FIG. 5. In the description of the present embodiment, it is assumed as an example that the row V23 hatched with diagonal lines in FIG. 6A is selected as a ranging region. Since an imaging signal is used for the selection, the time t3 at which readout of the ranging pixel is performed is the time after the time t2 at which readout of the last row of imaging pixels is performed. Based on the ranging signal, the ranging unit 500 then performs ranging corresponding to step S14 of FIG. 5, and the lens in the lens unit 200 is driven as illustrated in step S15 of FIG. 5.

In the present embodiment, since readout from imaging pixels, selection of a ranging region, and readout from ranging pixels are performed in the same frame period, the time of acquiring a signal for determining a ranging region and the time of acquiring a signal for performing ranging are close to each other. This results in a smaller difference between an object image in an image for determining a ranging region and an object image in performing actual ranging. Therefore, an imaging device that can further improve a ranging accuracy is provided.

While the selected row of the ranging pixel arrangement rows 112 is entirely read out in the example illustrated in FIG. 6A and FIG. 6B described above, the drive method can be modified to select and read out only a part in the row. FIG. 7A is an arrangement diagram of the pixel array 110 according to such a modified example, and FIG. 7B is a schematic diagram of drive timings of the imaging device 100 according to the modified example.

In the present modified example, a region hatched with diagonal lines of the row V16 in FIG. 7A is selected as a ranging region. Since other features are the same as those in FIG. 6A and FIG. 6B, the description thereof will be omitted. In the present modified example, a ranging region can be narrower than that in the example illustrated in FIG. 6A and FIG. 6B. Thereby, a readout time period of a ranging pixel can be shortened. Further, a reduction of a readout time period further reduces a difference between an object image in an image for determining a ranging region and an object image in performing actual ranging, and an imaging device that can further improve a ranging accuracy is provided.

Further, the configuration of the present modified example is also used for a case of reduced readout or added readout in a horizontal direction of imaging pixels. In this case, in order to maintain the ranging accuracy, it may be preferable not to perform reduced readout or added readout for ranging pixels. With the use of the present modified example and with a narrower ranging region, it is possible to match a readout time period per row of an imaging signal to a readout time period per row of a ranging signal even when reduced readout or added readout of imaging pixels is performed in the horizontal direction.

Note that, in the present modified example, the selection unit 600 uses an image generated from an imaging signal at step S12 of FIG. 5 to select which region within the row the readout of a ranging signal is to be performed from. FIG. 7A exemplifies a case where the selection unit 600 selects the right region from three regions (left, middle, right) within the row V16.

Second Embodiment

In the first embodiment, at the time t1, reset of all the ranging pixels is simultaneously performed. In this case, when a plurality of rows including ranging pixels are selected and a plurality of rows are sequentially read out, readout times of the plurality of rows become different. This results in different lengths of accumulation time period T2 for respective rows, which affects the ranging accuracy. The second embodiment provides an imaging device that can further improve the ranging accuracy by setting the same length of the accumulation time period T2 even when ranging pixels are read out from a plurality of rows.

FIG. 8A is an arrangement diagram of the pixel array 110 according to the second embodiment, and FIG. 8B is a schematic diagram of drive timings of the imaging device 100 according to the second embodiment. In the present embodiment, as illustrated in FIG. 8A, rows on which ranging pixels are arranged are divided into two pixel groups. A plurality of ranging pixels of the ranging pixel arrangement rows 112a (rows V11, V23, V35) are defined as a fourth pixel group, and a plurality of ranging pixels of the ranging pixel arrangement rows 112b (rows V16, V28, V40) are defined as a fifth pixel group.

As illustrated in FIG. 8B, a plurality of ranging pixels of the ranging pixel arrangement rows 112a are reset at the time t1a, and a plurality of ranging pixels of the ranging pixel arrangement rows 112b are then reset at the time t1b. The interval between the time t1a and the time t1b is around a readout time for one row. Then, at the time t3a after the accumulation time period T2 has elapsed from the time t1a, readout of ranging pixels selected from the ranging pixel arrangement rows 112a is performed. Afterwards, at the time t3b after the accumulation time period T2 has elapsed from the time t1b, readout of ranging pixels selected from the ranging pixel arrangement rows 112b is performed.

As discussed above, in the present embodiment, the ranging pixel arrangement rows are divided into two pixel groups, and reset is performed simultaneously on a pixel group basis. Thereby, a ranging signal can be read out row by row from each pixel group, and thus a ranging signal can be read out from two rows. Further, the lengths of the accumulation time period T2 of ranging pixels on two rows are the same. Therefore, provided is an imaging device that can further improve a ranging accuracy while obtaining ranging signal from a plurality of columns. Note that the number of pixel groups may be three or more.

While the selected rows of the ranging pixel arrangement rows 112a and 112b are entirely read out in the example illustrated in FIG. 8A and FIG. 8B described above, the drive method can be modified to read out only a part in the rows. FIG. 9A is an arrangement diagram of the pixel array 110 according to such a modified example, and FIG. 9B is a schematic diagram of drive timings of the imaging device 100 according to the modified example.

In a similar manner to the modified example of the first embodiment, regions hatched with diagonal lines of the rows V35 and V40 of FIG. 9A are selected as ranging regions in the present modified example. Also in the present modified example, the ranging region can be narrower than that in the example illustrated in FIG. 8A and FIG. 8B, and the same advantage as that in the modified example of the first embodiment can be obtained.

Third Embodiment

The orientation of the alignment of the pupil 702 and the pupil 703 is determined depending on the configuration of the imaging device 100. The first embodiment and the second embodiment are therefore provided on the condition that the detection direction for performing ranging by using a phase difference detection method is constant.

In ranging with a phase difference detection scheme, there is not only a scheme of separating a pupil image into the lateral direction (horizontal direction) to detect a phase difference (vertical line detection) but also a scheme of separating a pupil image into the vertical direction to detect a phase difference (horizontal line detection). In general, an object often includes more vertical lines than horizontal lines. Therefore, the vertical line detection may often be employed when a pupil image is separated in one direction only. However, it may be difficult to perform ranging by using the vertical line detection for an object including many horizontal lines.

Thus, in the third embodiment, the imaging device 100 is configured to be able to switch vertical line detection and horizontal line detection. For example, the pixel 120 of the imaging device is configured to include four photodiodes aligned in two rows by two columns, and vertical line detection or horizontal line detection can be performed by using two of four photodiodes. In such a way, when the imaging device 100 is configured to be able to perform both vertical line detection and horizontal line detection, although it is possible to perform both of the vertical line detection and the horizontal line detection, the readout time period can be shortened by selecting either one of the vertical line detection and the horizontal line detection to perform the phase difference detection.

An imaging device that can select either one of the vertical line detection and the horizontal line detection to perform phase difference detection as described above and an imaging system including thereof will be described as the third embodiment. FIG. 10 is a flowchart of the operation of the imaging system according to the third embodiment. In a flowchart illustrated in FIG. 10, step S12 of FIG. 5 is replaced with step S16. In the following description, the duplicate description of FIG. 5 will be omitted.

At step S16, the selection unit 600 uses an image generated from an imaging signal in the signal processing unit 300 to select a ranging region for reading out a ranging signal. Furthermore, the selection unit 600 uses such an image to select a detection direction, that is, select which of the vertical line detection and the horizontal line detection is to be performed. The selection unit 600 supplies information on the selection result to the imaging device 100. At step S13, a ranging signal is read out to the signal processing unit 300 from ranging pixels corresponding to a ranging region defined at step S16. This ranging signal includes signals from photodiodes associated with the detection direction defined at step S16.

Here, the selection of a detection direction in the selection unit 600 can be performed based on a feature or the like of an object image in the image generated from the imaging signal. In the present embodiment, readout from imaging pixels, selection of a ranging direction, and readout from ranging pixels are performed during the same frame period. This results in a smaller difference between an object image in an image used for selecting the detection direction and an object image in performing actual ranging. Therefore, in the present embodiment, in addition to the advantage of the first embodiment, an imaging device that can further improve an accuracy in selection of a detection direction is provided.

A specific method of selection of a detection direction in the selection unit 600 may include a method that acquires projection data associated with two directions of the horizontal direction and vertical direction or the like of an image and, based thereon, analyzes the feature of an object to select a preferred detection direction. More specifically, it is possible to use the levels of the maximum value and the minimum value of each projection data or the intensity at a particular frequency in a spatial frequency spectrum obtained by applying the Fourier transform to each projection data to select a detection direction. Here, "projection data" means a one-dimensional alignment data obtained by adding or averaging two-dimensional data for any one dimension. Note that it is not essential to acquire projection data, and a detection method may be selected by analyzing the feature of an object based on the spatial frequency spectrum obtained by applying the two-dimensional Fourier transform to the original data.

Note that the detection direction is not limited to the vertical direction and the horizontal direction, and it may include an oblique direction or the like, for example, other than the vertical and horizontal directions.

Fourth Embodiment

Figure 11A:
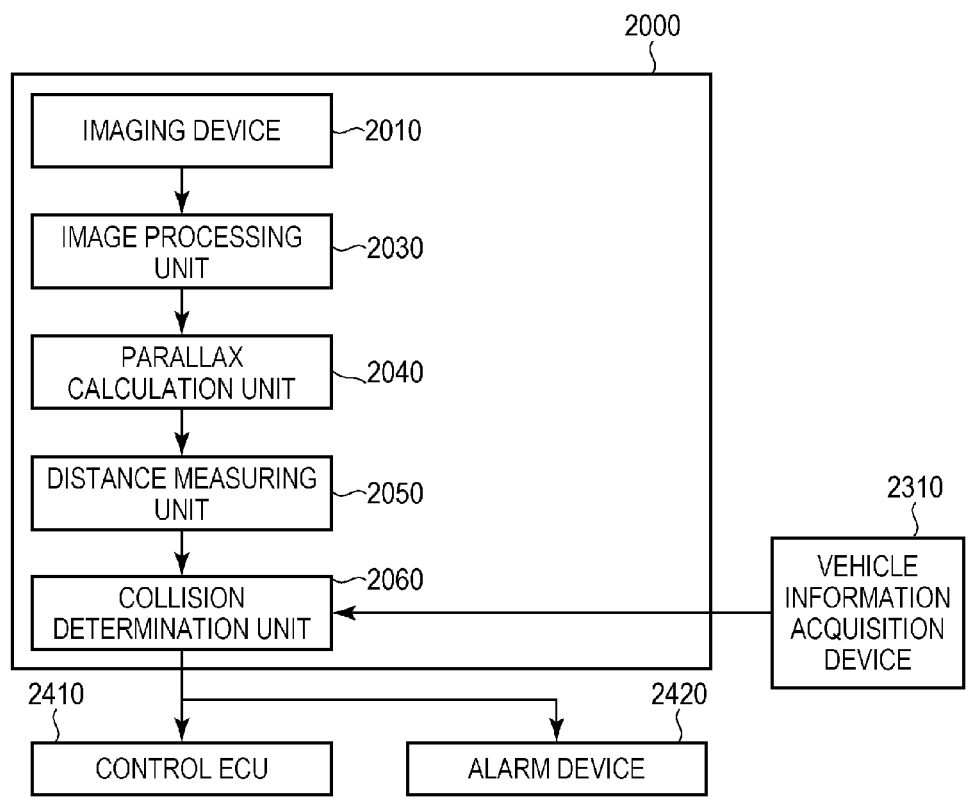
FIG. 11A and FIG. 11B are diagrams illustrating a configuration of an imaging system and a mobile apparatus according to a fourth embodiment of the present invention.
Figure 11B:
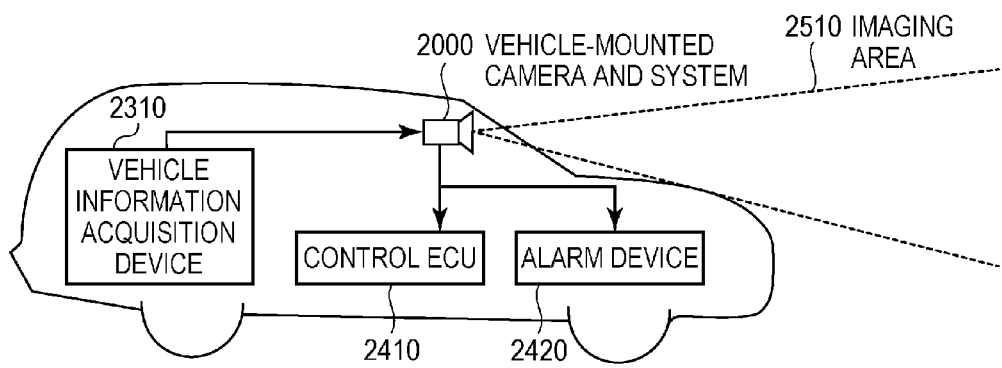

FIG. 11A and FIG. 11B illustrate an example of an imaging system regarding a vehicle-mounted camera. An imaging system 2000 has an imaging device 2010 of the embodiments described above. The imaging system 2000 has an image processing unit 2030 that performs image processing on a plurality of image data acquired by the imaging device 2010 and a parallax calculation unit 2040 that performs calculation of a parallax (a phase difference of parallax images) from the plurality of image data acquired by the imaging system 2000. Further, the imaging system 2000 has a distance measuring unit 2050 that calculates a distance to an object based on the calculated parallax and a collision determination unit 2060 that determines whether or not there is a possibility of a collision based on the calculated distance. Here, the parallax calculation unit 2040 or the distance measuring unit 2050 is an example of a distance information acquisition unit configured to acquire distance information with respect to an object. That is, distance information is information on a parallax, a defocus amount, a distance to an object, or the like. The collision determination unit 2060 may use any of the distance information to determine a possibility of a collision. The distance information acquisition unit may be implemented by hardware designed dedicatedly or may be implemented by a software module. Further, it may be implemented by a Field Programmable Gate Array (FPGA), an Application Specific Integrated Circuit (ASIC), or the like or may be implemented by the combination thereof.

The imaging system 2000 is connected to a vehicle information acquisition device 2310 and can acquire vehicle information such as a vehicle speed, a yaw rate, a steering angle, or the like. Further, the imaging system 2000 is connected to a control ECU 2410 that is a control device that outputs a control signal for generating braking force to the vehicle based on the determination result in the collision determination unit 2060. Further, the imaging system 2000 is also connected to an alarm device 2420 that generates an alarm to the driver based on the determination result in the collision determination unit 2060. For example, when the possibility of a collision is high as a determination result of the collision determination unit 2060, the control ECU 2410 performs vehicle control for avoiding a collision or reducing damage by applying a brake, releasing an accelerator, suppressing an engine output, or the like. The alarm device 2420 alerts a user by sounding an alarm such as a sound, displaying alert information on a screen of a car navigation system or the like, giving vibration to a seatbelt or a steering, or the like. The imaging system 2000 functions as a control unit configured to control the operation for controlling a vehicle as described above.

In the present embodiment, the peripheral of, for example, in front or rear of a vehicle is imaged by the imaging system 2000. FIG. 11B illustrates an imaging system when imaging an area in front of a vehicle (an imaging area 2510). The vehicle information acquisition device 2310 as an imaging control unit transmits instructions to the imaging system 2000 to the imaging device 2010 so as to perform the operation described in the first to third embodiments described above. Since the operation of the imaging device 2010 is the same as that in the first to third embodiments, the description thereof will be omitted here. Such a configuration can further improve the ranging accuracy.

While an example of controlling a vehicle so as to prevent a collision with another vehicle has been described above, the embodiment can be applied to control of automatic drive for following another vehicle, control of automatic drive so as not to go out of a lane, or the like. Furthermore, the imaging system can be applied to any mobile apparatus (mobile device) such as a ship, an airplane, an industrial robot, or the like, for example, without limited to a vehicle such as an automobile. In addition, it can be applied to a wide variety of equipment which utilizes object recognition such as intelligent transport systems (ITS) or the like without limited to a mobile apparatus.

Other Embodiments

The present invention can be implemented in various forms without departing from its technical concept or its primary features. For example, it is to be appreciated that an embodiment in which a part of the configuration of any of the embodiments is added to another embodiment or an embodiment in which a part of the configuration of any of the embodiments is replaced with a part of the configuration of another embodiment is an embodiment to which the present invention is applied.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-163662, filed Aug. 24, 2016, which is hereby incorporated by reference herein in its entirety.

What is claimed is:

1. An imaging device comprising:
a plurality of pixels each of which outputs at least one of an imaging signal and a ranging signal,
wherein the imaging device performs
a first readout operation that reads out the imaging signal from a first pixel group of the plurality of pixels, and
a second readout operation that, after the first readout operation and before a readout operation for next acquiring the imaging signal is performed, reads out the ranging signal from a second pixel group of the plurality of pixels, wherein,
in the first readout operation, the imaging signal is not read out from a third pixel group of the plurality of pixels,
in a period from a reset of the first pixel group to a next reset of the first pixel group, the third pixel group is reset, and
the second pixel group is selected from the third pixel group based on the imaging signal read out by the first readout operation.

2. The imaging device according to claim 1, wherein the third pixel group is reset before completion of the first readout operation.

3. The imaging device according to claim 1, wherein at least two of the pixels included in the third pixel group are simultaneously reset.

4. The imaging device according to claim 1, wherein the imaging signal associated with the third pixel group is obtained by interpolation using the imaging signal obtained by the first readout operation.

5. The imaging device according to claim 1,
wherein the third pixel group includes a fourth pixel group and a fifth pixel group,
wherein the pixels included in the fourth pixel group are simultaneously reset, and
wherein the pixels included in the fifth pixel group are simultaneously reset after reset of the pixels included in the fourth pixel group.

6. The imaging device according to claim 1, wherein all the pixels included in the third pixel group are simultaneously reset.

7. The imaging device according to claim 1,
wherein the plurality of pixels are arranged to form a plurality of rows and a plurality of columns, and
wherein the third pixel group is formed of the pixels arranged in a region associated with a plurality of rows of the plurality of pixels.

8. The imaging device according to claim 7, wherein the second pixel group is formed of the pixels arranged in a region associated with a part of rows of the third pixel group.

9. The imaging device according to claim 7, wherein the second pixel group is formed of the pixels arranged in a region associated with a part of rows and a part of columns of the third pixel group.

10. The imaging device according to claim 1,
wherein the ranging signal is used for ranging by phase difference detection, and
wherein a detection direction in the phase difference detection is selected based on the imaging signal read out by the first readout operation.

11. The imaging device according to claim 10, wherein selection of the detection direction in the phase difference detection is performed based on projection data obtained from the imaging signal read out by the first readout operation.

12. The imaging device according to claim 10, wherein selection of the detection direction in the phase difference detection is performed based on a spatial frequency spectrum obtained by applying two-dimensional Fourier transform to the imaging signal read out by the first readout operation.

13. The imaging device according to claim 1, wherein a first accumulation time period after the first pixel group is reset and before the imaging signal is read out and a second accumulation time period after the second pixel group is reset and before the ranging signal is read out have the same length.

14. An imaging system comprising:
an imaging device according to claim 1; and
a signal processing unit configured to process a signal output from the imaging device.

15. A drive method of an imaging device including a plurality of pixels each of which outputs at least one of an imaging signal and a ranging signal, the drive method comprising:
- a first readout step of reading out the imaging signal from a first pixel group of the plurality of pixels, wherein the imaging signal is not read out from a third pixel group of the plurality of pixels;
- a reset step of resetting the third pixel group in a period from a reset of the first pixel group to a next reset of the first pixel group;
- a selection step of selecting the second pixel group from the third pixel group based on the imaging signal read out by the first readout step; and
- a second readout step of reading out the ranging signal from the second pixel group after the first readout step and before a readout step for next acquiring the imaging signal is performed.

16. A mobile apparatus comprising an imaging control unit configured to control an imaging device having a plurality of pixels each of which outputs at least one of an imaging signal and a ranging signal,
- wherein the imaging control unit
- instructs, to the imaging device, a first readout operation of reading out the imaging signal from a first pixel group of the plurality of pixels, wherein the imaging signal is not read out from a third pixel group of the plurality of pixels;
- instructs, to the imaging device, a reset operation of resetting the third pixel group of the plurality of pixels in a period from a reset of the first pixel group to a next reset of the first pixel group;
- instructs, to the imaging device, a second readout operation of reading out the ranging signal from a second pixel group of the plurality of pixels after the first readout operation and before a readout operation for next acquiring the imaging signal is performed; and
- selects the second pixel group from the third pixel group based on the imaging signal read out by the first readout operation.

17. The mobile apparatus according to claim 16 further comprising:
- a distance information acquisition unit configured to acquire distance information with respect to an object based on the ranging signal from the imaging device; and
- a control unit configured to control the mobile apparatus based on the distance information.

* * * * *